United States Patent [19]
Fikse

[11] Patent Number: 6,030,057
[45] Date of Patent: Feb. 29, 2000

[54] TRACTOR ENDLESS TREAD

[76] Inventor: Tyman H. Fikse, 732 Tillamook St., LaConner, Wash. 98257

[21] Appl. No.: 09/017,998

[22] Filed: Feb. 3, 1998

Related U.S. Application Data

[63] Continuation-in-part of application No. 08/666,941, Jun. 19, 1996, Pat. No. 5,741,052.

[51] Int. Cl.$^7$ .................................................. B62D 55/08
[52] U.S. Cl. ............................ 305/181; 305/40; 305/180
[58] Field of Search ..................................... 305/160, 161, 305/162, 165, 169, 180, 187, 189, 190, 181, 40

[56] References Cited

U.S. PATENT DOCUMENTS

| | | | |
|---|---|---|---|
| 2,329,303 | 9/1943 | Stewart | 305/202 |
| 2,452,671 | 11/1948 | Merrill | 305/40 X |
| 2,494,066 | 1/1950 | Slemmons | 305/181 |
| 2,702,213 | 2/1955 | Lund | 305/40 X |
| 2,707,658 | 5/1955 | Grenier | 305/181 |
| 4,241,956 | 12/1980 | Meisel, Jr. | 305/181 |
| 4,443,041 | 4/1984 | Wohlford | 305/187 X |
| 4,645,274 | 2/1987 | Wohlford et al. | 305/180 X |
| 5,707,123 | 1/1998 | Grob | 305/180 X |

FOREIGN PATENT DOCUMENTS

| 481836 | 9/1929 | Germany | 305/160 |
|---|---|---|---|

*Primary Examiner*—Russell D. Stormer

[57] ABSTRACT

Endless loops spaced lengthwise of elongated grouser-mounting plates of a tractor endless tread in which each loop includes two side-by-side stretches of wire rope having the interstices between the strands of both wire rope stretches filled with elastomer material, and both stretches of wire rope being embedded in elastomer material integrating the two stretches into a single embedment, the two wire rope loops being secured to the grouser-mounting plates by spaced U-shaped bends of clamping strips bolted to the grouser-mounting plates, and spacer plates bridge between adjacent grouser-mounting plates and make loose tongue-and-groove joints therewith for enabling the grouser-mounting plates and the spacer plates to tilt relatively as the endless tread travels around a tractor wheel, but the straight tread portion of the tread extending between tractor wheels spaced lengthwise of the tractor is substantially inflexible inward.

9 Claims, 16 Drawing Sheets

TRACTOR ENDLESS TREAD

RELATED APPLICATION

This application is a continuation-in-part of application Ser. No. 08/666,941, filed Jun. 19, 1996, now U.S. Pat. No. 5,741,052, for Tractor Endless Tread.

BACKGROUND OF THE INVENTION

1. Field of the Invention

This invention relates to a tractor endless tread composed of grouser-mounting base plates strung on twin endless strings, each string including a pair of side-by-side wire rope stretches filled with elastomer material and embedded in elastomer material.

2. Prior Art

A tractor endless tread having grousers strung on cables is disclosed in Fikse U.S. Pat. No. 3,063,758, issued Nov. 13, 1962, for Strung Section Flexible Band Vehicle Track. The structure of the present tread is simplified and is more durable.

The Myers U.S. Pat. No. 2,326,719, issued Aug. 10, 1943, and the Keck U.S. Pat. No. 2,392,988, issued Jan. 15, 1946 show vehicle tracks incorporating cables embedded in rubber, but the structure of these tracks is quite different from the track of the present invention.

SUMMARY OF THE INVENTION

A principal object of the invention is to provide a string of rigid grouser-mounting base plates forming an endless band which are interconnected by wire rope loops that are protected against fatigue.

A more specific object is to protect such wire rope loops from fatigue by filling the interstices of the wire rope with elastomer material.

A further object is to improve the flexibility of the wire rope loops by embedding the wire rope in elastomer material.

It is also an object to provide an endless tractor tread having rigid grouser-mounting base plates strung on a wire rope loop in a construction which will enable individual grouser-mounting base plates to be removed easily from the tread and replaced with substitute grouser-mounting plates.

Another object is to provide flexible joints between adjacent grouser-mounting base plates of an endless band of grouser-mounting base plates forming a tractor tread.

More specifically, it is an object to provide floating plates between the grouser-mounting base plates which plates are held together by tongue-and-groove slip joints, such joints being flexible to enable bending of the tread in one direction but which joints are also inflexible to prevent appreciable bending of the tread in the opposite direction.

An additional object is to provide an endless band of grouser-mounting base plates in which the grouser-mounting base plates may be of different selected lengths.

The foregoing objects can be accomplished by a tractor tread including a band of elongated grouser-mounting base plates connected together by two wire rope loops spaced apart lengthwise of the grouser-mounting base plates a distance several times as great as the width of a grouse-mounting base plate, each loop being composed of two side-by-side wire rope stretches filled with elastomer material and embedded in elastomer material, which loops are secured to the grouser-mounting plates by U-shaped clamps. Intervening spacer plates located between adjacent grouser-mounting plates are integrated with such grouser-mounting plates by loose tongue-and-groove joints.

DETAILED DESCRIPTION

The tractor tread of the present invention can be used on various caterpillar-type tractors, Caterpillar being defined in *Webster's Third New International Dictionary* as:

a trademark used for a tractor made for use on rough or soft ground and moved on two endless metal belts.

The definition of a "caterpillar tread" is given as the endless chain belt on which a caterpillar-type vehicle runs.

A "tractor" is defined as 2 an apparatus or device for the draught or sometimes propulsion of another body, . . .

b (1) a four-wheeled or caterpillar tread rider-controlled automotive vehicle used especially for drawing agricultural or other implements or for bearing and propelling such implements.

In the present application, the designation "tractor tread" is intended to refer to an endless tread suitable for use on a caterpillar-type tractor.

Figure 1:
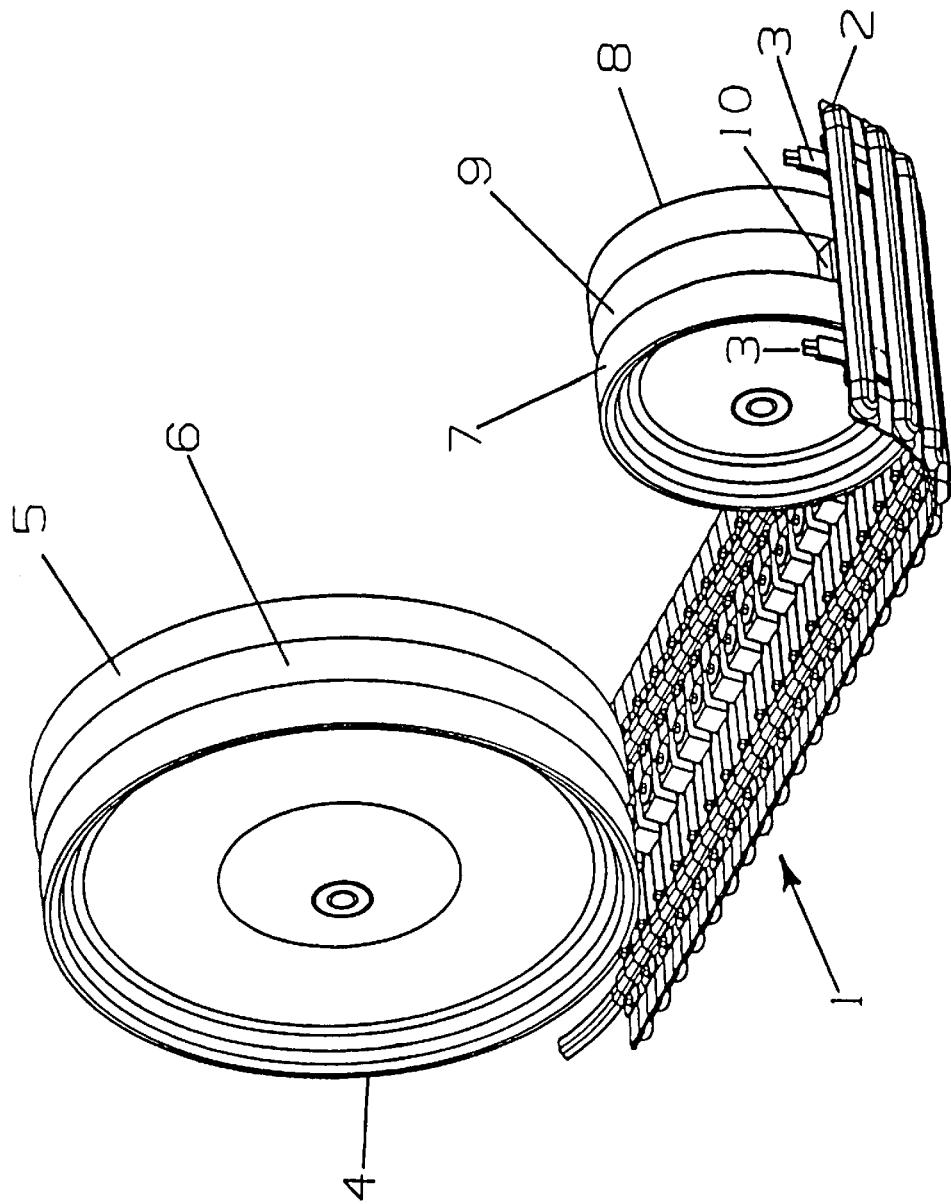
FIG. 1 is a fragmentary top perspective of a portion of a tractor and a portion of a tractor tread according to the present invention.

It is preferred that the tread of the present invention be used on tractors having large driving wheels and small idler wheels carrying the tread, as shown in FIG. 1, but treads of the type of the present invention could be used on other caterpillar-type vehicles, the arrangement shown in FIG. 1 being merely illustrative.

In FIG. 1, the tread 1 is composed of grousers 2 strung on loops 3 embodying wire rope to form endless loops. The tractor has large coaxial drive wheels 4 and 5 spaced apart transversely to provide an annular groove 6 between them. The smaller idler wheels 7 and 8 also are coaxial and have between them an annular groove 9. The purpose of the grooves 6 and 9 is to provide guidance and transverse stability for the tread by coacting with guide blocks 10 on the tread which are received in the grooves 6 and 9 when the tread travels around the driving wheels and the idler wheels.

Figure 2:
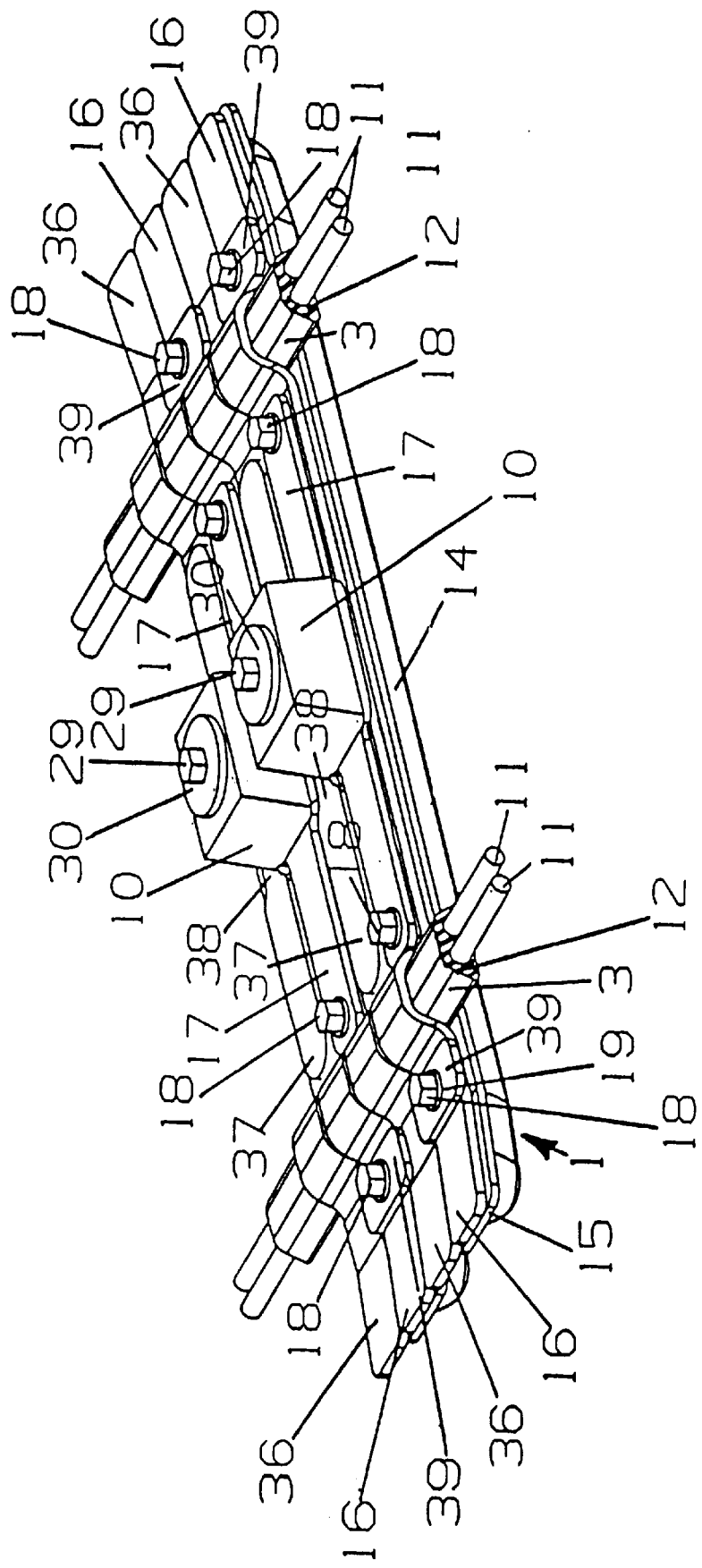
FIG. 2 is an enlarged top perspective of a portion of the tread of the present invention.
Figure 3:
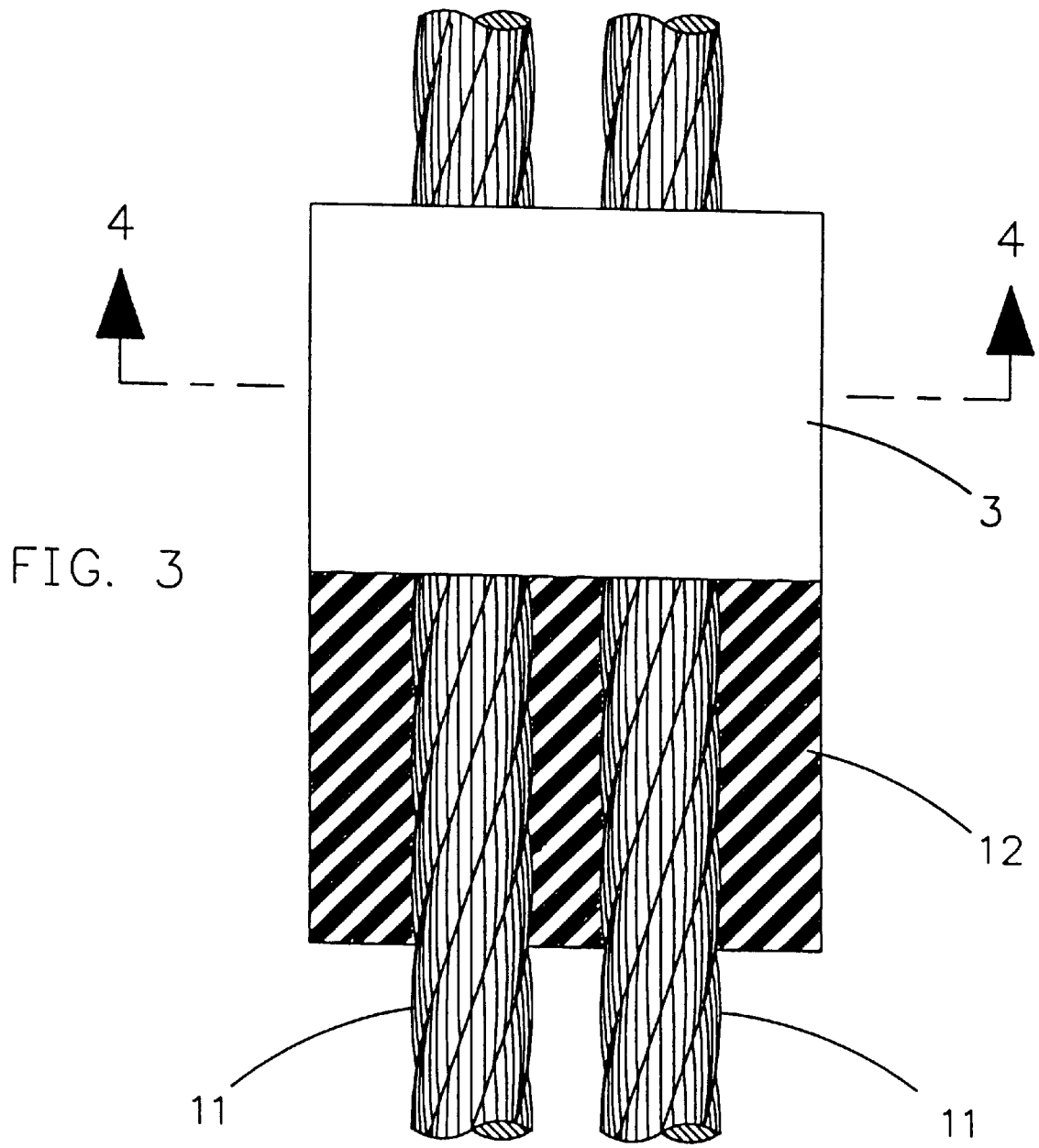
FIG. 3 is a plan of a portion of a wire rope loop of the present invention, parts being broken away.
Figure 4:
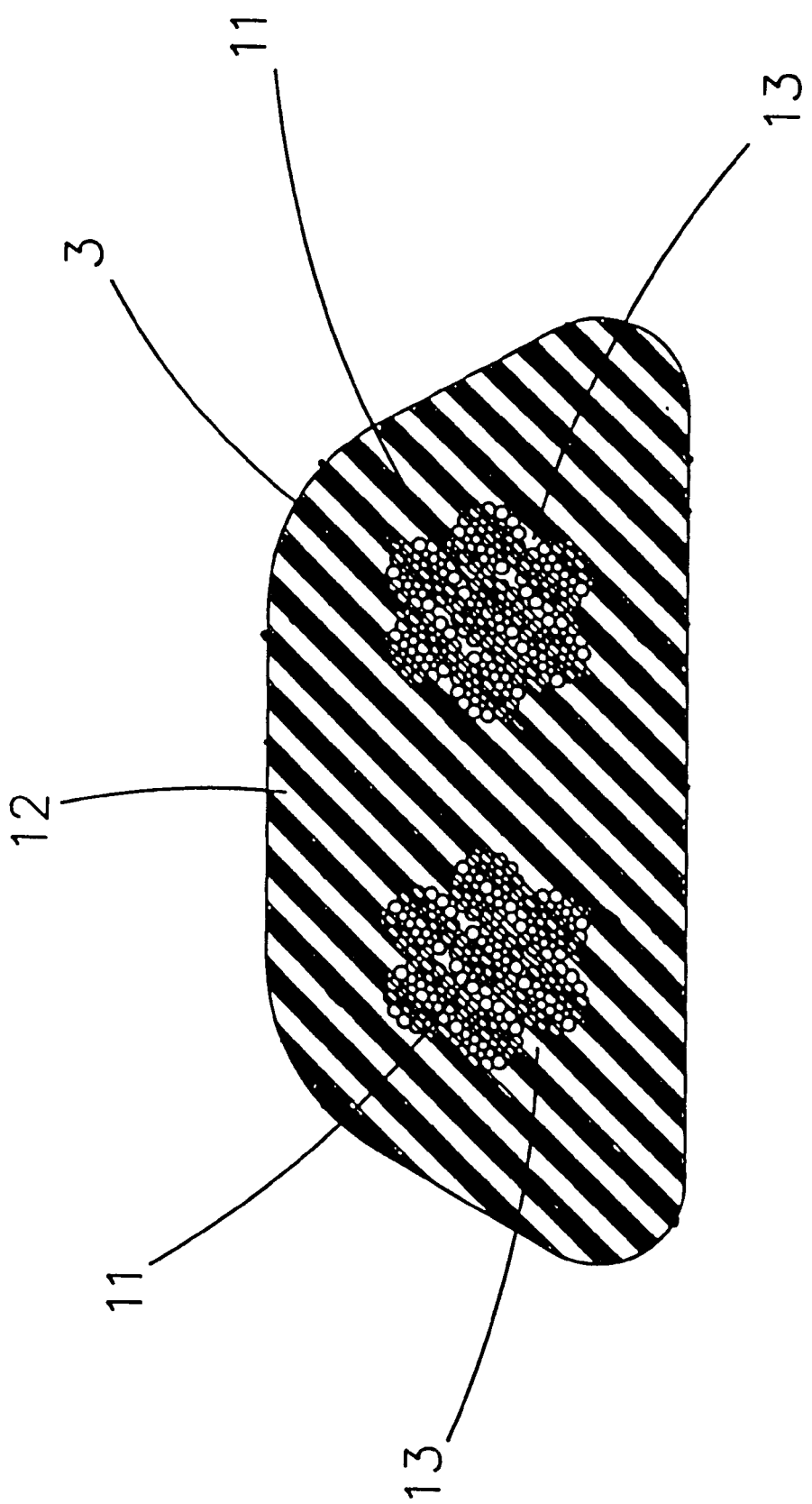
FIG. 4 is a transverse section through the wire rope loop taken on line 4—4 of FIG. 3 shown on an enlarged scale.

FIG. 2 is a detailed top perspective of a portion of the tread showing the manner in which the wire rope endless loops 3 are assembled with the various components of the tread. A key feature of the tread is the structure of the grouser-connecting wire rope endless loops 3 which is shown in detail in enlarged FIGS. 3 and 4. Each grouser-carrying loop 3 includes one, and preferably two, wire rope endless loops 11 embedded in an encasement 12 of elastomer material. The stretches of the doubled wire rope are arranged in side-by-side relationship as shown in FIGS. 3 and 4 to provide a generally flat embedment. The inner side of the embedment may be narrower than the wider outer side to form a truncated equilateral triangle cross section, the corners of which are rounded, and the edges of which converge inwardly away from such wider side and toward the narrower side, as shown in FIG. 4.

A most important feature of the grouser-carrying loops is that the wire ropes 11 are filled with elastomer material, that is, the interstices between and around the helically twisted strands of the wire rope including the exterior crevices 13 are filled with such material. Such filled wire rope is embedded in the elastomer encasement 12 as shown in FIGS. 3 and 4. This treatment of the wire rope increases greatly its fatigue life as the grouser-connecting wire rope loops flex during travel around the arcs of the loop established by the tractor wheels. The embedment also provides support for the wire rope loop as it travels around the arcs of the tractor wheels without appreciably decreasing the flexibility of the wire rope.

Figure 5:
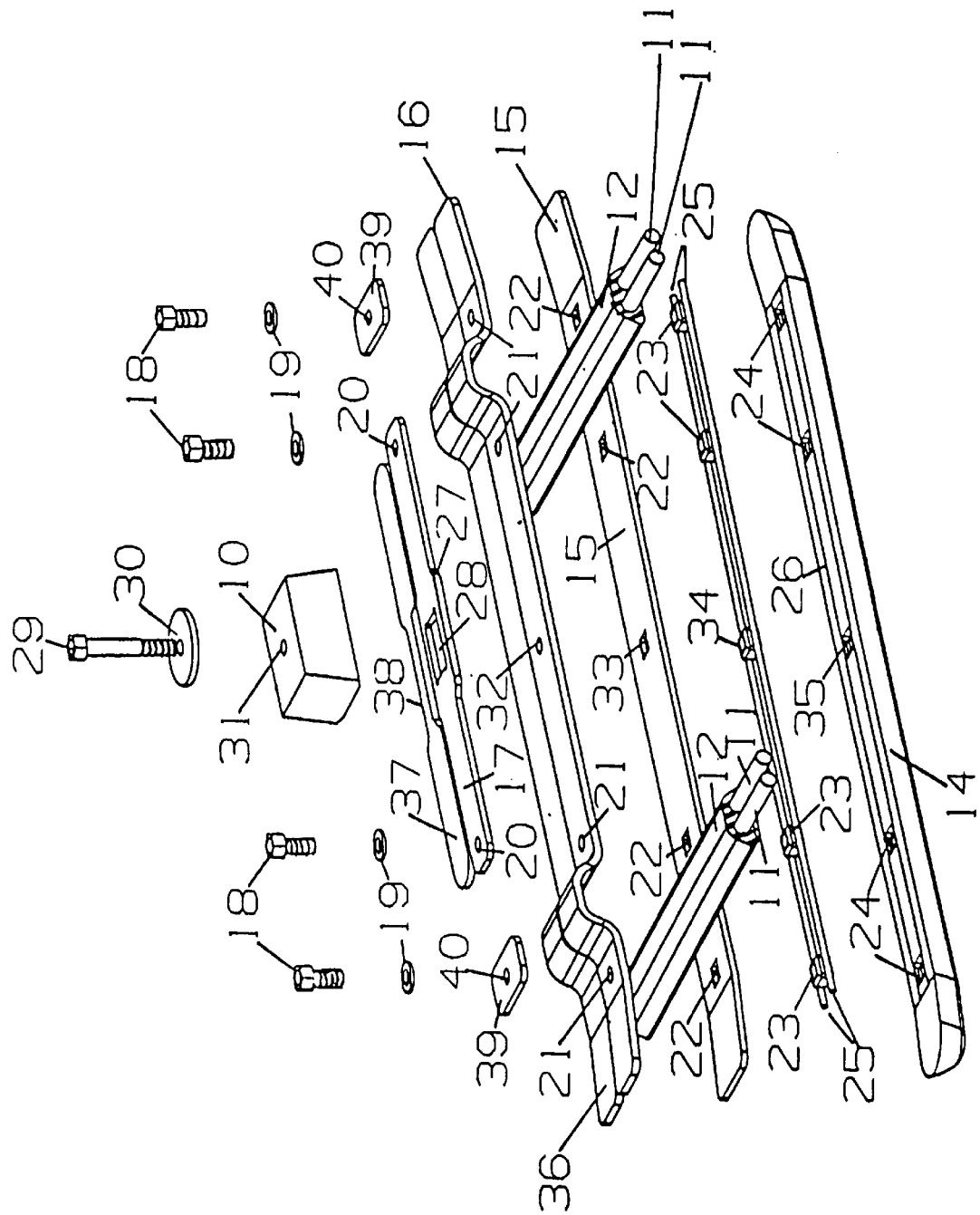
FIG. 5 is a top perspective of the retaining structure for integrating the grousers and grouser-connecting wire rope loops, parts being shown in exploded relationship.

The wire rope loops 3 are integrated with the tractor tread grousers in the manner indicated in FIG. 2 by the components of the integrating structure shown exploded in FIG. 5 and in specific assembled relationships shown in FIGS. 2, 6, 7, 8, 9 and 10.

The grousers 2 are composed of bars 14 of relatively hard elastomer material, such as medium hard rubber, which are bonded to the elongated grouser-mounting base plates 15, the lengths of which are a considerable number of times as great as the widths of the plates, such as the length of a grouser-mounting base plate being twenty to forty times as great as its width.

Stretches of two wire rope loops 3 are overlie the grouser-mounting base plates 15 extending transversely thereof and located in spaced relationship a distance a considerable number of times as great as the width of a grouser-mounting base plate, such as ten to twenty times the width of a grouser-mounting base plate. The stretches of wire rope loop embedments are secured to each grouser-mounting base plate in such positions by the generally U-shaped bows in a clamping strip 16 extending between and connecting such bows to form an integral clamping strip including such two bows overlying the grouser-mounting base plate and the two wire rope loops. The central portion of the clamping strip is reinforced by a stiffening strip 17 that overlies the portion of the clamping strip 16 between the U-shaped loop clamping portions. The cross section of a wire rope loop embedment is of truncated equilateral triangular shape with rounded corners, including a wider side and an opposite narrower side with opposite embedment edges joining the opposite embedment sides converging away from the wider embedment side and toward the narrower embedment side. Each clamping strip bow portion embraces the narrower side, the convergent edges and rounded corners of the wire rope loop embedment so that its sweep of such clamping portions is easy to eliminate pronounced stress-concentration points.

The stiffening strip 17, the clamping strip 16 and the grouser-mounting base plate 15 are secured rigidly together by securing bolts 18 which pass in succession outward through washers 19, apertures 20 in the stiffening strip 17, apertures 21 in the clamping strip 16, and apertures 22 in the grouser-mounting base plate 15. The securing bolts are screwed into nuts 23 which can be received in recesses 24 in the grouser bar 14. The nuts 23 are secured between and welded to two nut-holding rods 25 arranged parallel to the grouser-mounting base plate 15 and spaced apart so that the nuts cannot turn as the bolts 18 are tightened. The rods 25 can be received in a groove or grooves 26 in the grouser bar 14 as shown in FIGS. 7, 8, 9 and 10. Tightening of the bolts 18 at each side of an endless loop draws a bow of a clamping strip 16 toward its grouser-mounting plate 15 to force the bow into firm engagement with the inwardly converging edges of the wire rope embedment causing such edges to exert a wedging action on the clamping bow to anchor the endless loop 3 securely to the grouser-mounting base plates 15.

A rectangular aperture 28 in the central portion of the stiffening strip 17, which is widened, can receive a downward projection of complemental rectangular shape on the bottom of the guide block 10 to locate it relative to the grouser-mounting structure and to prevent the guide block from pivoting relative to such structure. The guide block is held in position relative to the grouser-mounting structure by a bolt 29 passing successively through a washer 30, an aperture 31 in the guide block 10, an aperture 32 in the clamping strip 16 and an aperture 33 in the grouser-mounting base plate 15. The threaded end of the bolt 29 can be screwed into a nut 34 received in the recess 35 of the grouser bar 14 and held between and welded to the nut-holding rods 25. When the bolt 29 is tightened, it will secure the guide block 10 to the grouser-mounting structure and grouser-connecting wire rope loops 3.

The grouser bar 14 can be bonded to the grouser-mounting base plate 15 either at this point in the assembly of the tread structure or before assembly of the grouser-mounting base plate 15 with the other components of the tread above it as described. In either case, however, it is essential that the nuts 23 and 34 and the nut-holding rods 25 be received in the recesses in the grouser bar 14 before it is bonded to the grouser-mounting base plate 15.

Figure 7:
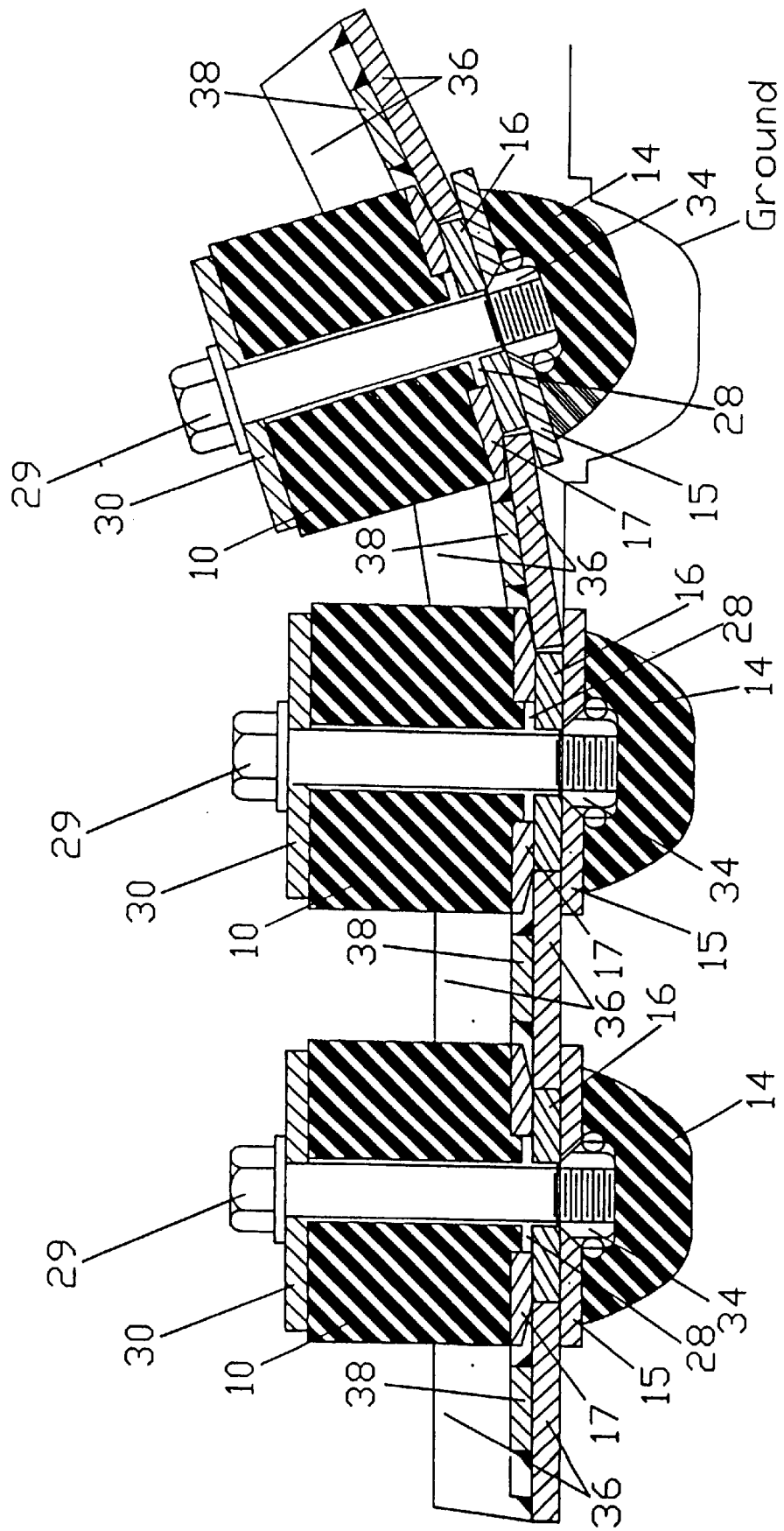
FIGS. 7, 8, 9 and 10 are sections through the tread assembly shown in FIG. 6 taken on lines 7—7, 8—8, 9—9 and 10—10, respectively, of that figure.

The relative tilting of the guide blocks 10 as the tread travels around the mounting wheels of the tractor reduces the clearance between their inner ends as compared with the guide block spacing along the straight stretches of the tread between the drive wheels 4, 5 and idler wheels 7, 8 as shown in FIG. 7. It is desirable for the grousers 2 to be spaced apart lengthwise of the tread a reasonable distance, such as by a spacing somewhat less than the width of the grouser-mounting base plates 15.

Figure 8:
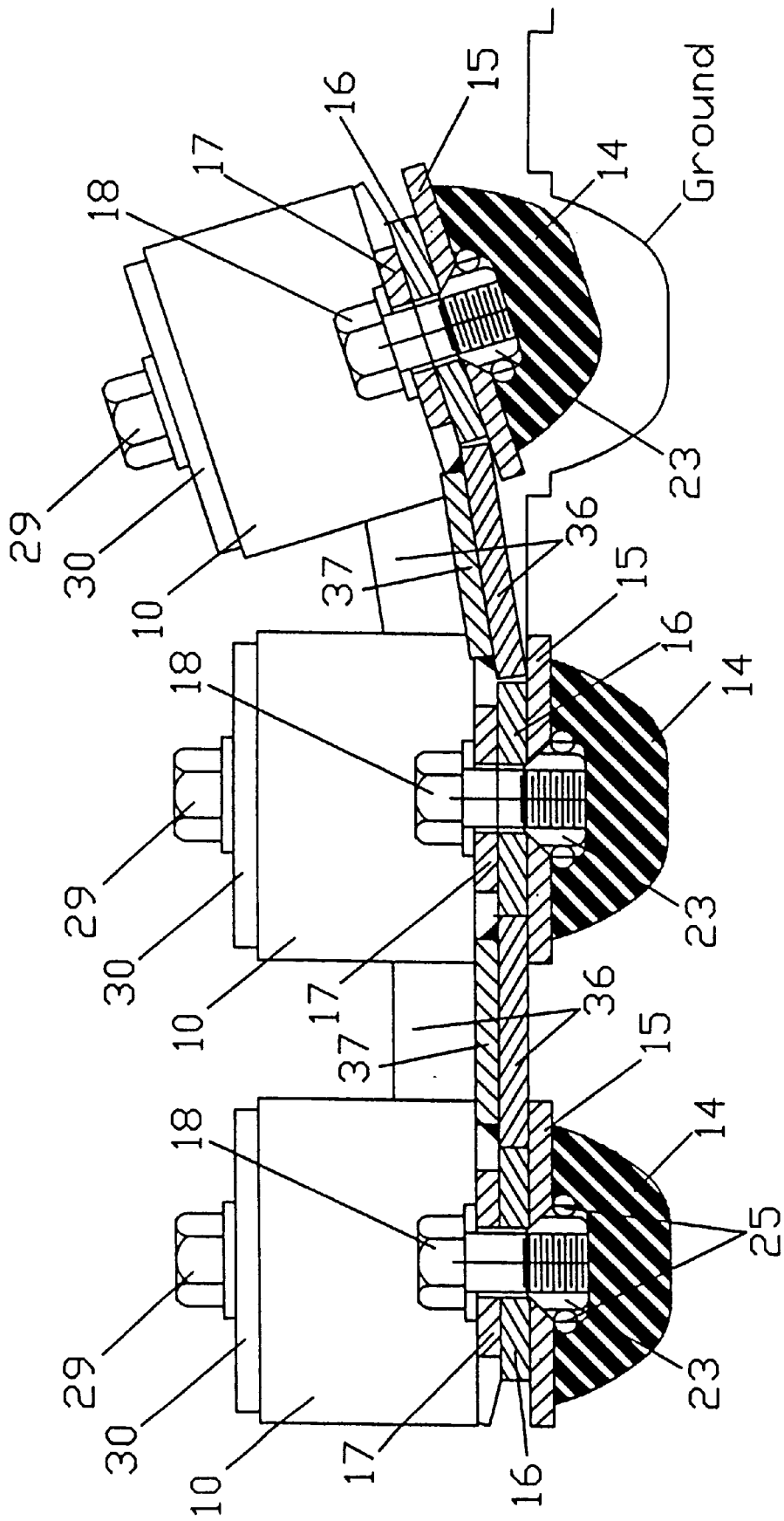
Figure 9:
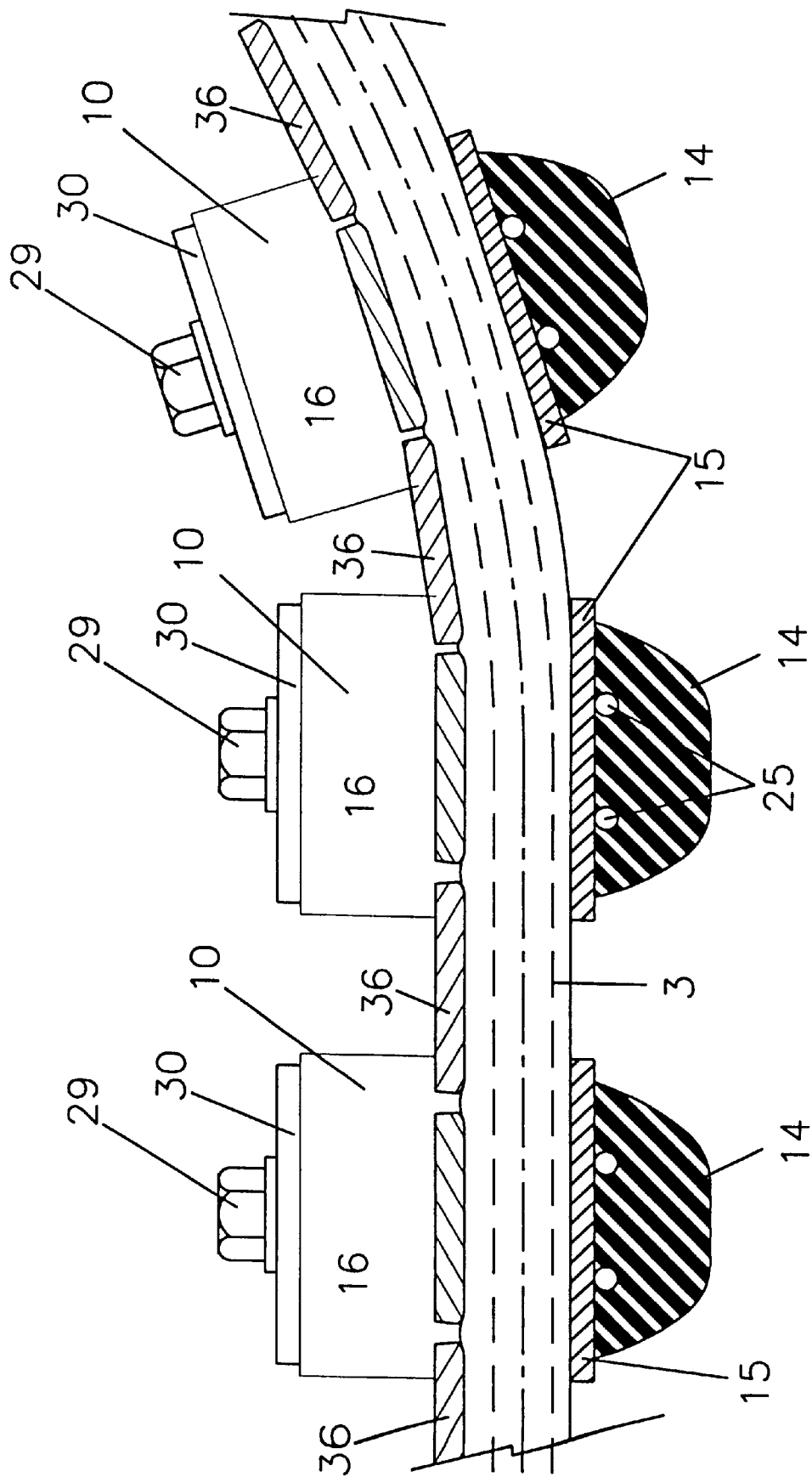

Spacing of the grouser-mounting base plates 15 is assured by intermediate spacer strips 36 located alternately between and bridging between the wire rope clamping strips 16, as shown in FIG. 2. These spacer strips are floating between the clamping strips. They are held against appreciable movement transversely of the tread by generally U-shaped bends or bows similar to the U-shaped bows in the clamping strips 16 embracing the wire rope loops 3. Movement of the spacer strips 36 lengthwise of the track is limited by connecting such strips with the grouser-mounting base plates 15 and clamping strips 16 by loose tongue-and-groove joints offset from the endless loops 3, as shown in FIGS. 7, 8 and 10.

The floating intermediate spacer strips 36 form tongues of the tongue-and-groove joints. As shown in FIGS. 7 and 8, the intermediate spacer strips are disposed coplanar with the central portions of the clamping strips 16 between their loop-engaging bends. The intermediate spacer strips and the clamping strips are of substantially equal thickness as shown in FIGS. 7 and 10. The edges of such floating tongue strips 36 fit into grooves formed between the grouser-mounting base plates 15 and the wider central portions of the stiffening strips 17 at the opposite sides of apertures 28 as shown in FIG. 7. As shown in FIGS. 7, 8 and 10, the grouser-mounting base plates are wider than the clamping strips 16 so that their opposite margins provide ledges forming the outer sides of the grooves engageable by the tongue-forming intermediate spacer strips 36 as shown in FIGS. 7, 8 and 10.

The width of the widened central portions of stiffening strips 17 is approximately equal to the width of the grouser-mounting base plates 15 as shown in FIG. 7 so that the opposite margins of these central portions overhang the margins of the adjacent intermediate spacer strips 36 and form the inner sides of the tongue-and-groove joint grooves. The clamping strips 16 form the bottoms of such grooves. These joints are located between the two endless loops 3. The under edges of the widened central portions of the stiffening strips are beveled or chamfered as shown in FIG. 7 to accommodate relative tilting between such stiffener strips and the intermediate spacer strips 36 as the tread rounds the tractor wheels to enable the tread to flex locally in one direction. The opposite margins of the grouser-mounting base plates 15 are not beveled or chamfered so that the tread is inflexible in the opposite direction. Thus, even though the straight portion of the tread between the tractor wheels rides over a hump during travel of the tractor, that portion of the tread will not be bowed upward but will be maintained substantially planar.

Figure 10:
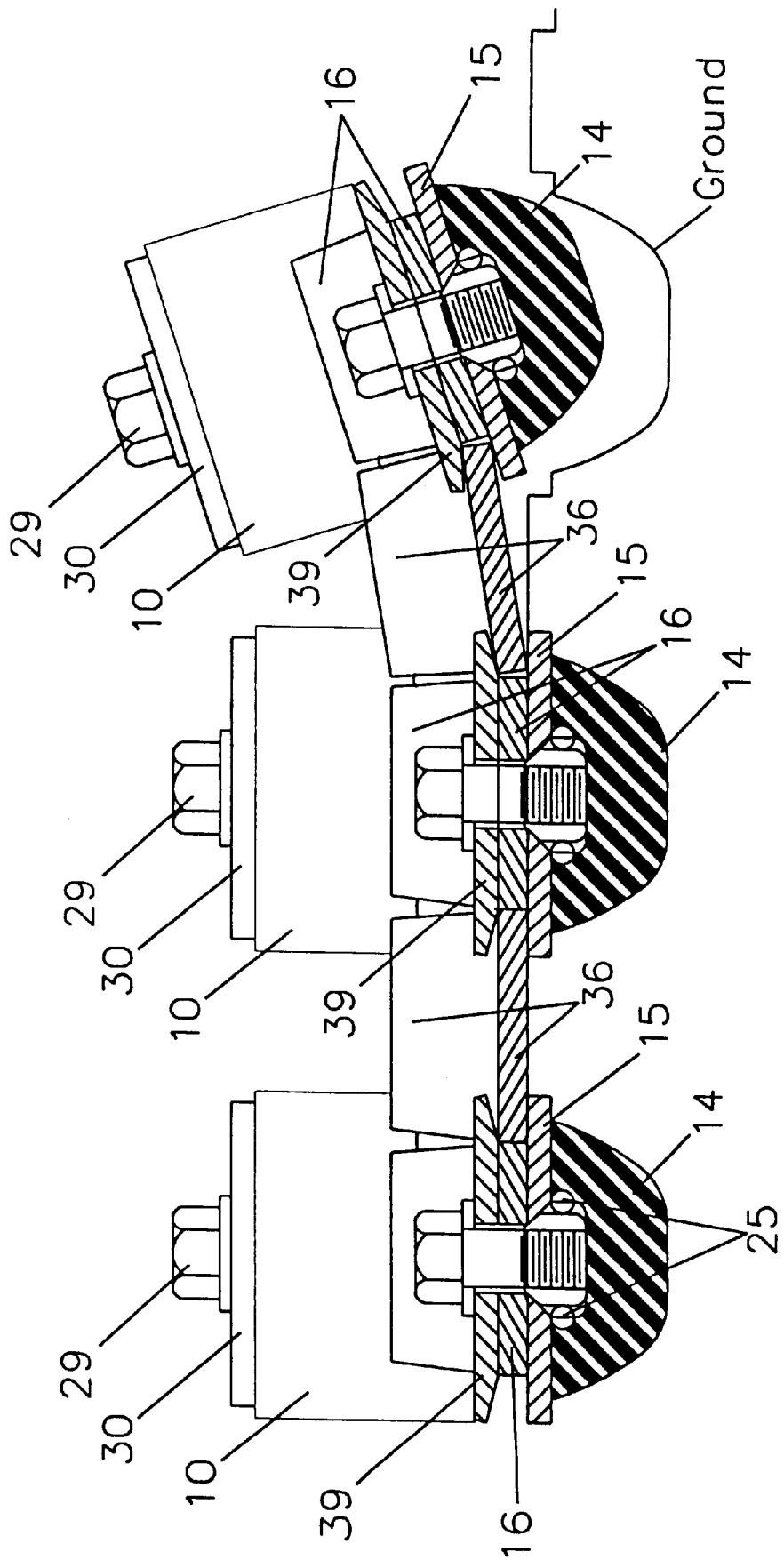
Figure 11:
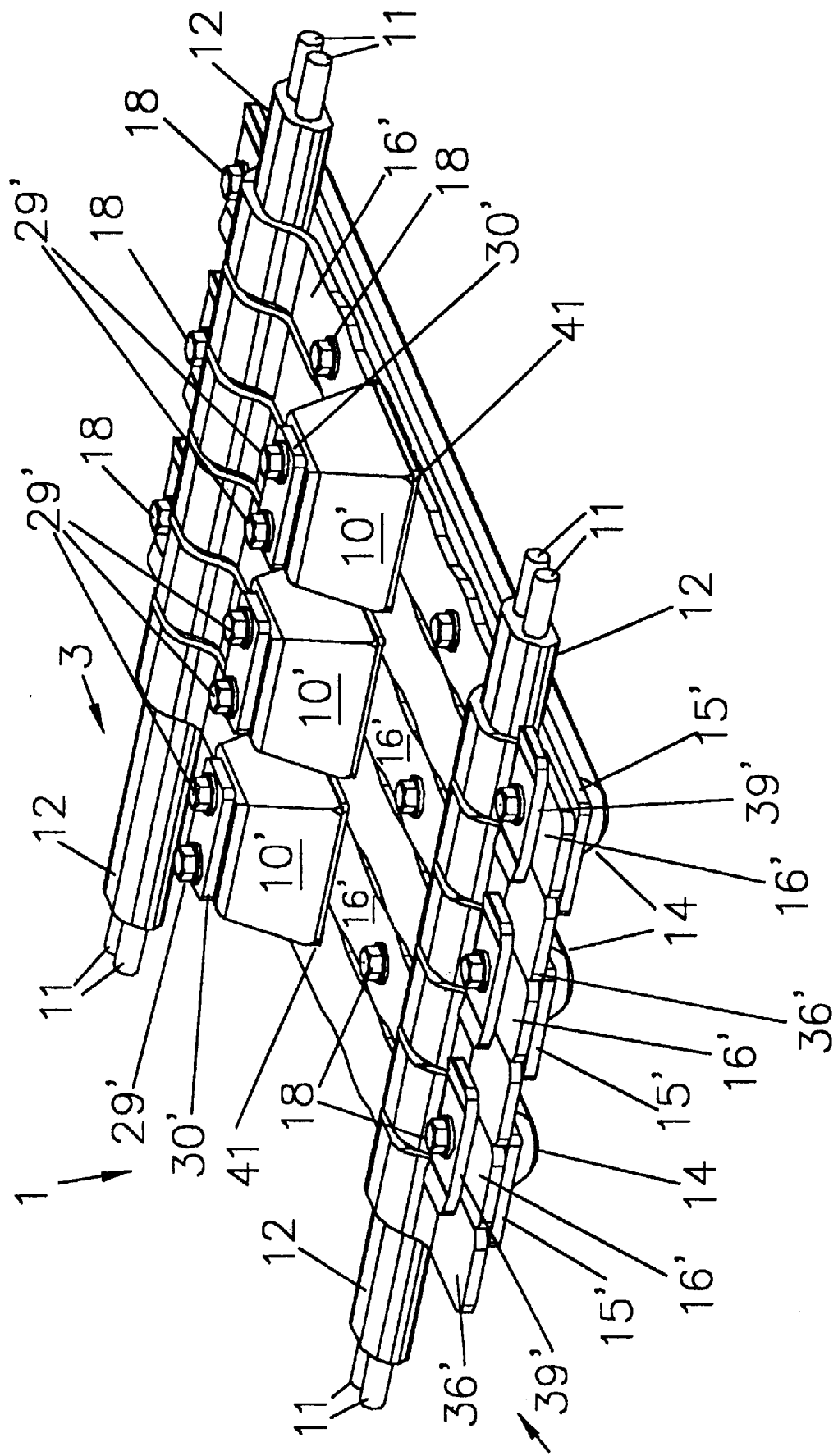
FIG. 11 is a top perspective of a section of the tractor tread having a somewhat modified structure.

Additional loose tongue-and-groove joints are formed at the side of each endless loop 3 remote from the other endless loop between the intermediate spacer strips 36 and the outer end portions of the clamping strips 16 by short crosspieces 39 mounted overlying the clamping strips 16 at locations outward of the U-shaped wire rope loop clamping bends by providing a hole 40 in each crosspiece through which a bolt 18 extends, as shown in FIG. 10. The opposite margins of the outer end portions of the spacer strips 36 constitute the tongues of such additional joints and the grooves receiving such tongues are formed by the end portions of the crosspieces 39, the margins of the grouser-mounting base plates 15 and the clamping strips 16 as shown in FIG. 10.

The end portions of the crosspieces 39 are underbeveled or chamfered to provide the relief necessary for enabling the outer end portions of the clamping strips 16 and the intermediate spacer strips 36 to tilt relatively as the tread moves around the tractor wheels, as shown in FIG. 10. Again, as in the tongue-and-groove joints in the central portion of the grousers, the tongue-and-groove joints between the outer portions of the grouser-mounting base plates 15 and the intermediate spacer strips 36 are inflexible inward because the margins of the outer portions of the grouser-mounting base plates 15 forming the outer sides of the grooves are not beveled or chamfered.

The intermediate spacer strips 36 can be stiffened by shorter strips 37 extending between the loop-engaging U-shaped bends of the spacer strips as shown in FIG. 2. The central portions 38 of stiffening strips 37 are narrowed by edge recesses so that these strips will not interfere with the guide blocks 10 or the widened central portions of the stiffening strips 17 as shown in FIG. 7. The stiffening strips 37, 38 can be secured to the spacer strips 36 by edge welding, as shown in FIG. 7 and FIG. 8.

Because the grouser-connecting wire rope loops 3 are secured to the grouser structure by clamp strips 16, individual grouser assemblies can be removed from the tread and replaced without disturbing the rest of the tread assembly. To remove a single grouser, the bolts 18 and 29 for that grouser can be removed, which will free the grouser-mounting base plate 15 from the clamping strip 16. The grouser-mounting base plate 15 and grouser bar can then be removed and replaced by a substitute grouser-mounting base plate 15 to which a new grouser bar 14 is bonded. The bolts 18 and 29 can then be replaced so that the wire rope loops 3 are clamped to the new grouser-mounting base plate 15 and grouser bar 14.

Such replacement of a grouser can be effected when the grouser bar has become worn excessively. Alternatively, such a grouser assembly can be replaced by a grouser assembly of different length. For example, one, several or all grouser assemblies can be replaced with a longer grouser assembly or assemblies without changing the spacing of the twin grouser-connecting wire rope loops 3. The longer grousers would provide greater traction or, if all the assemblies were replaced, the tread would have a greater ground contact area for decreasing the unit load of the tractor on soft ground.

As the tread travels around the path defined by the tractor wheels, dirt, particularly if its clay content is high, may tend to lodge on top of the lower straight stretch of the tread between the tractor wheels and in the spaces between the reinforcing strips 17 and the reinforcing strips 37 shown in FIGS. 2, 7, and 8. Travel of the tread around the tractor wheels effects working between the adjacent reinforcing strips 17 and 37 which scavenges such dirt as the tread bends in passing around the tractor wheels and causes such dirt to slough off.

Figure 6:
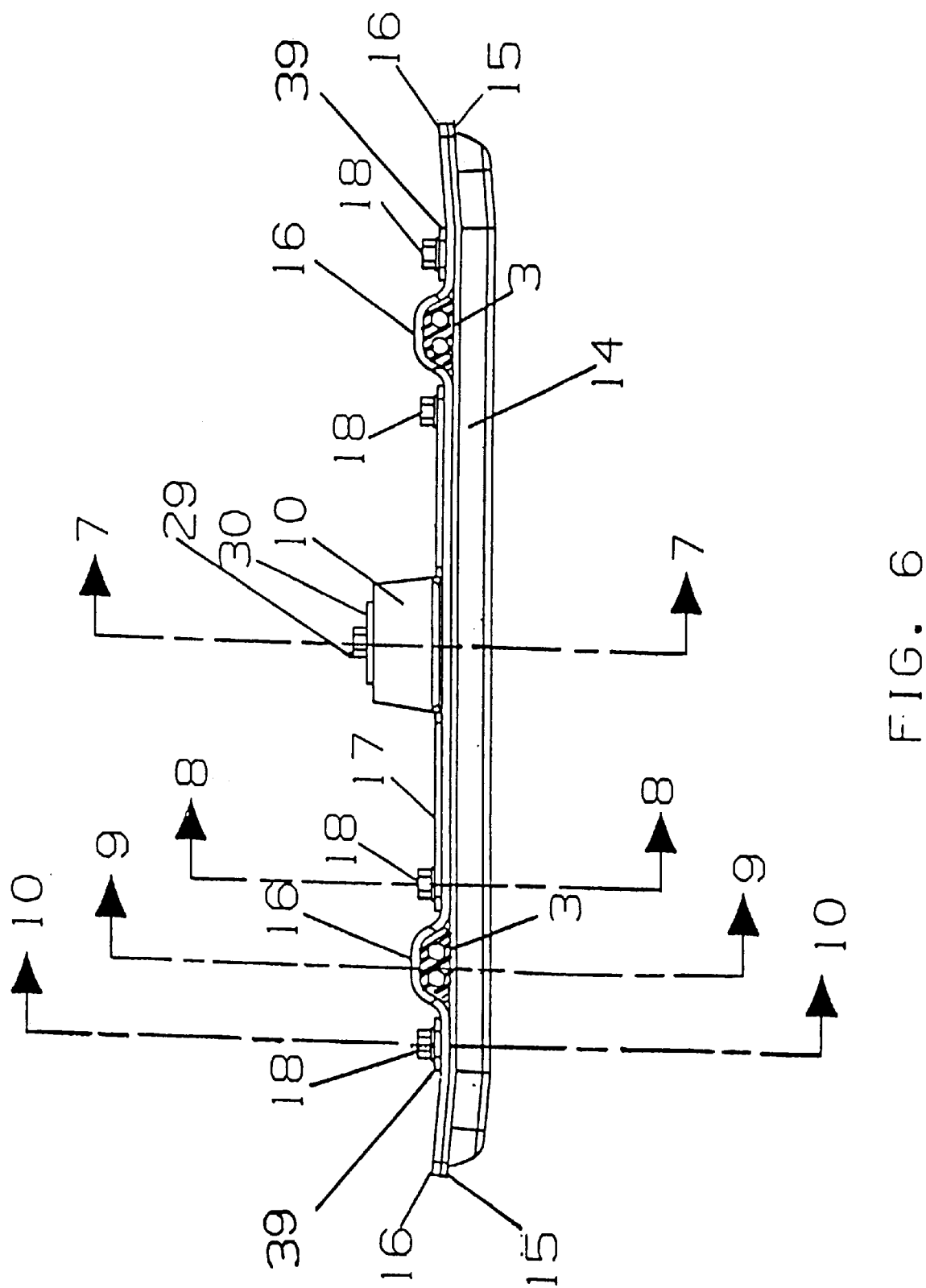
FIG. 6 is a cross section through the tractor tread showing the parts of the retaining structure of FIG. 5 in assembled relationship.

In order to reduce the tendency of the tread edges to dig into the dirt as the tractor turns, it is preferable for the end portions of the grouser assemblies to be bent up somewhat as shown in FIG. 6 so that the edge portions of the tread will slide more readily over the dirt as the tractor turns.

In the modified tractor endless tread structure shown in FIGS. 11 to 16, the stiffening strip 17 for the clamping bar 16 has been eliminated and the stiffening strip 37 for the spacer strip 36 has been eliminated. Such elimination would also eliminate the aperture 28 in the stiffening strip 17, the function of which is to prevent swiveling of a guide block 10 around the axis of the retaining bolt 29. In the modified structure of FIGS. 11, 12, 14, 15, and 16, swiveling of the guide blocks 10' is prevented by attaching them to the tread structure by twin bolts 29'. The heads of the bolts 29' bear on cap plates 30' spanning between the bolts and overlying the guide blocks 10'.

Figure 14:
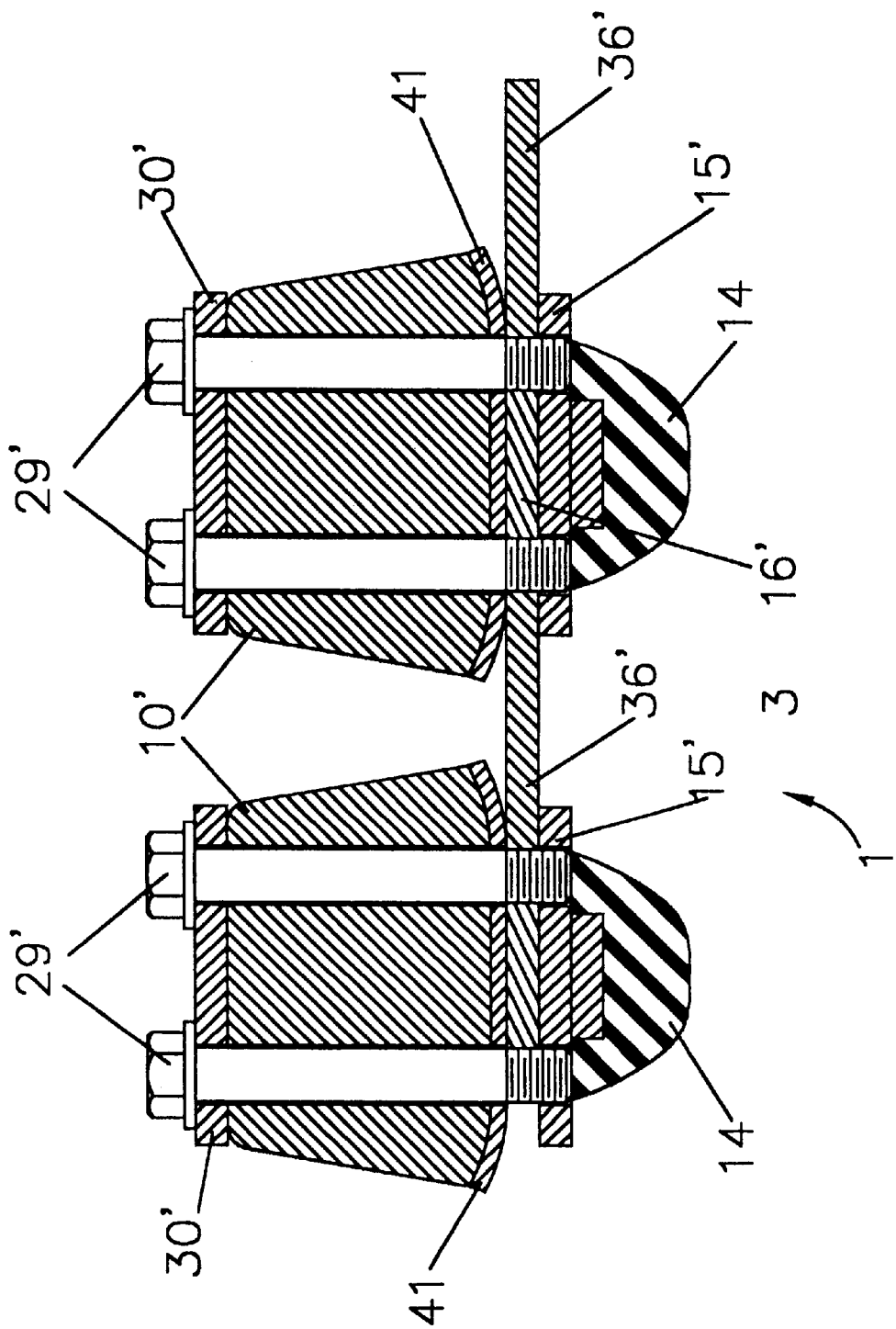
FIG. 14 is a section through the tread assembly shown in FIG. 13 taken on line 14—14 of that figure.
Figure 15:
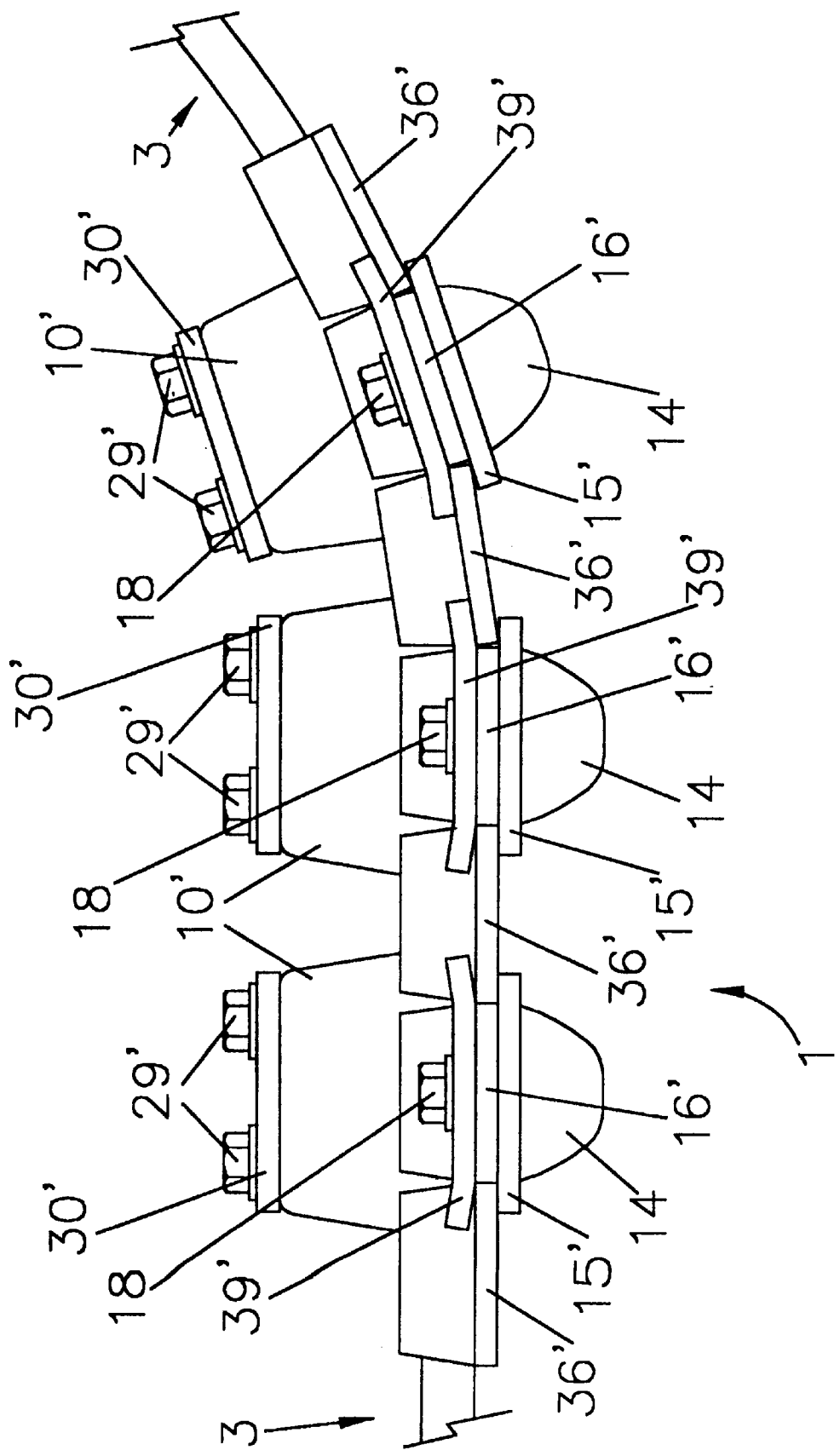
FIG. 15 is an edge elevation of the tread of FIG. 11.
Figure 16:
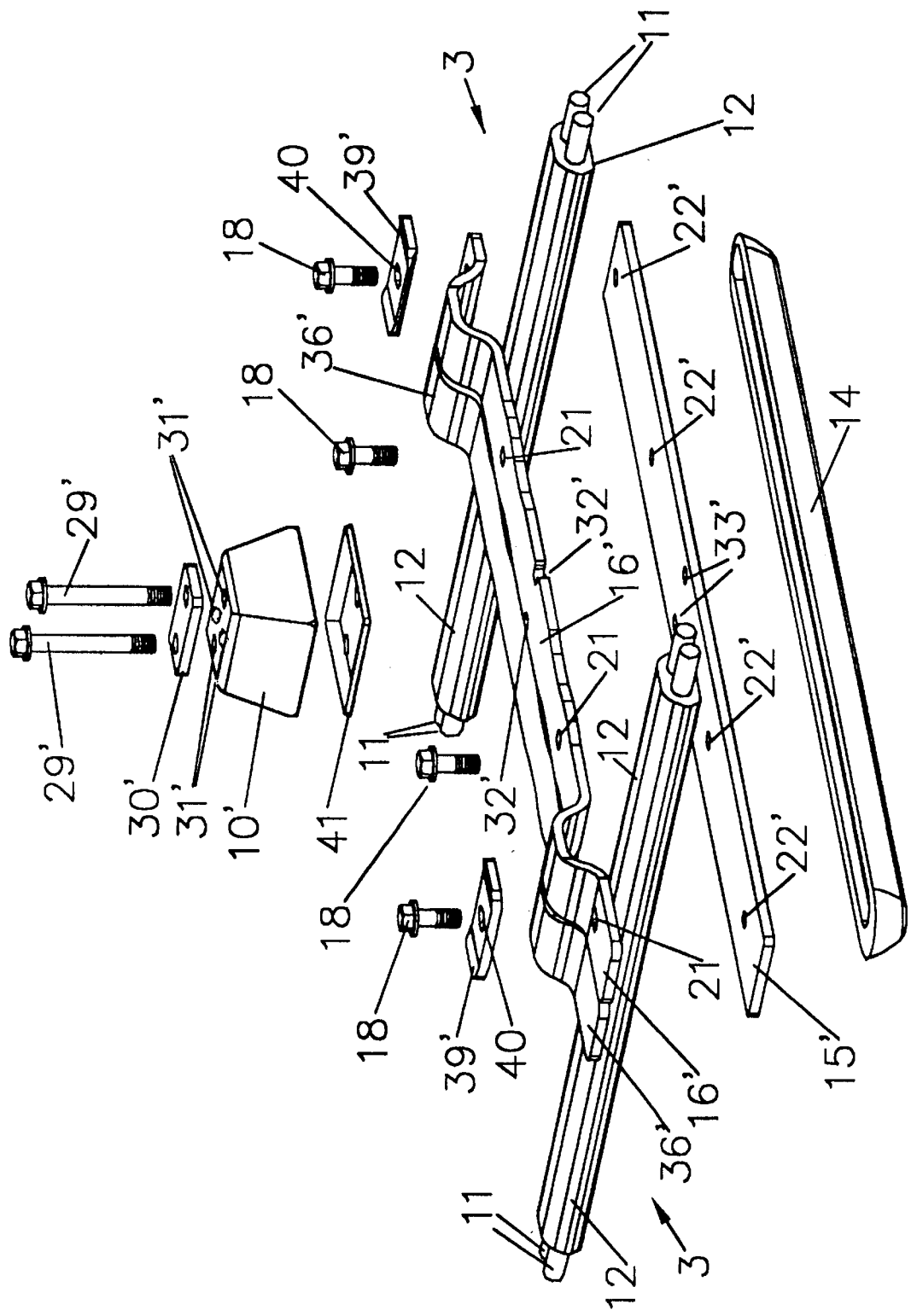
FIG. 16 is a top perspective of the tread shown in FIG. 11 showing the retaining structure for integrating the grousers and grouser-connecting wire rope loops, parts being shown in exploded relationship.

The track endless tread of FIGS. 1 to 10 has been further simplified in the embodiment shown in FIGS. 11 to 16 by elimination of the nuts 23 and 34 shown in FIG. 5 and the rods 25 holding those nuts. Instead, the grouser-mounting base plate 15' has been provided with tapped holes to receive the threaded ends of bolts 18 and 29'. The bolts 29' are shown screwed into the grouser-mounting base plates 15' in FIG. 14. Because of their spacing lengthwise of the tractor tread, notches 32' are provided for the bolts 29' in the opposite edges of the wire loop clamping strips 16', as shown in FIG. 16.

In order to be able to turn the guide blocks 10' through 90 degrees in the event that such guide blocks become worn, four holes 31' are provided through the guide blocks arranged in two pairs disposed perpendicular to each other, and the guide blocks are of square cross section in the form of a truncated pyramid.

In the form of tractor tread shown in FIGS. 1 to 10, the central tongue-and-groove slip joints between the spacer strips 36 and the clamping strips 16 include the edge portions of the reinforcing strips 17, as shown in FIG. 7. As mentioned above, in the modified form of tractor tread shown in FIGS. 11 to 16, the reinforcing strips 17 have been eliminated.

Instead, a bottom plate 41 has been provided in which the bottom of the guide block 10' seats. The plate 41 is of a width lengthwise of the tractor tread greater than the width of a clamping strip 16', being sufficient to overlap the margins of the central portions of spacer strips 36', as shown in FIG. 14, to form the inner side of the groove of the tongue-and-groove joint between the opposite edges of the spacer strips 36' and the grouser-mounting structure as shown in FIG. 14.

Figure 12:
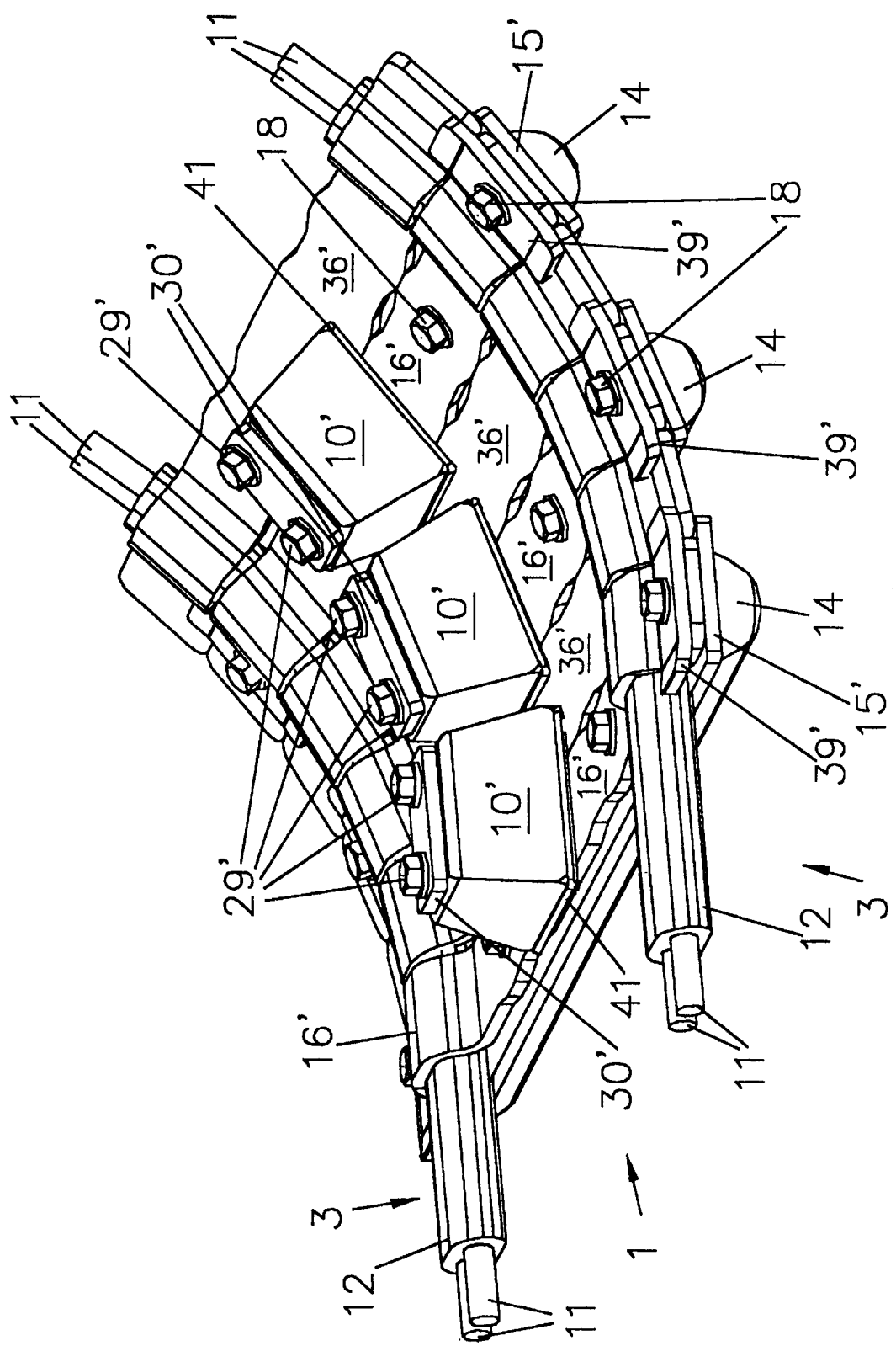
FIG. 12 is a top perspective of a portion of a tractor tread like that shown in FIG. 11.

It will be noted that the opposite margins of the bottom plates 41 for the guide blocks are bent inward so that such margins do not interfere with the deflection of the spacer strips 36' relative to the clamping strips 16' as the tread moves around a wheel, as shown in FIGS. 12 and 15.

Likewise, the opposite margins of the crosspieces 39' are bent inward, as shown in FIGS. 11, 12, 15 and 16. Such bent margins provide clearance between the spacer strips 36' and the crosspieces 39' as an alternative to the chamfering of the margins of the crosspieces 39, as shown in FIG. 10.

Figure 13:
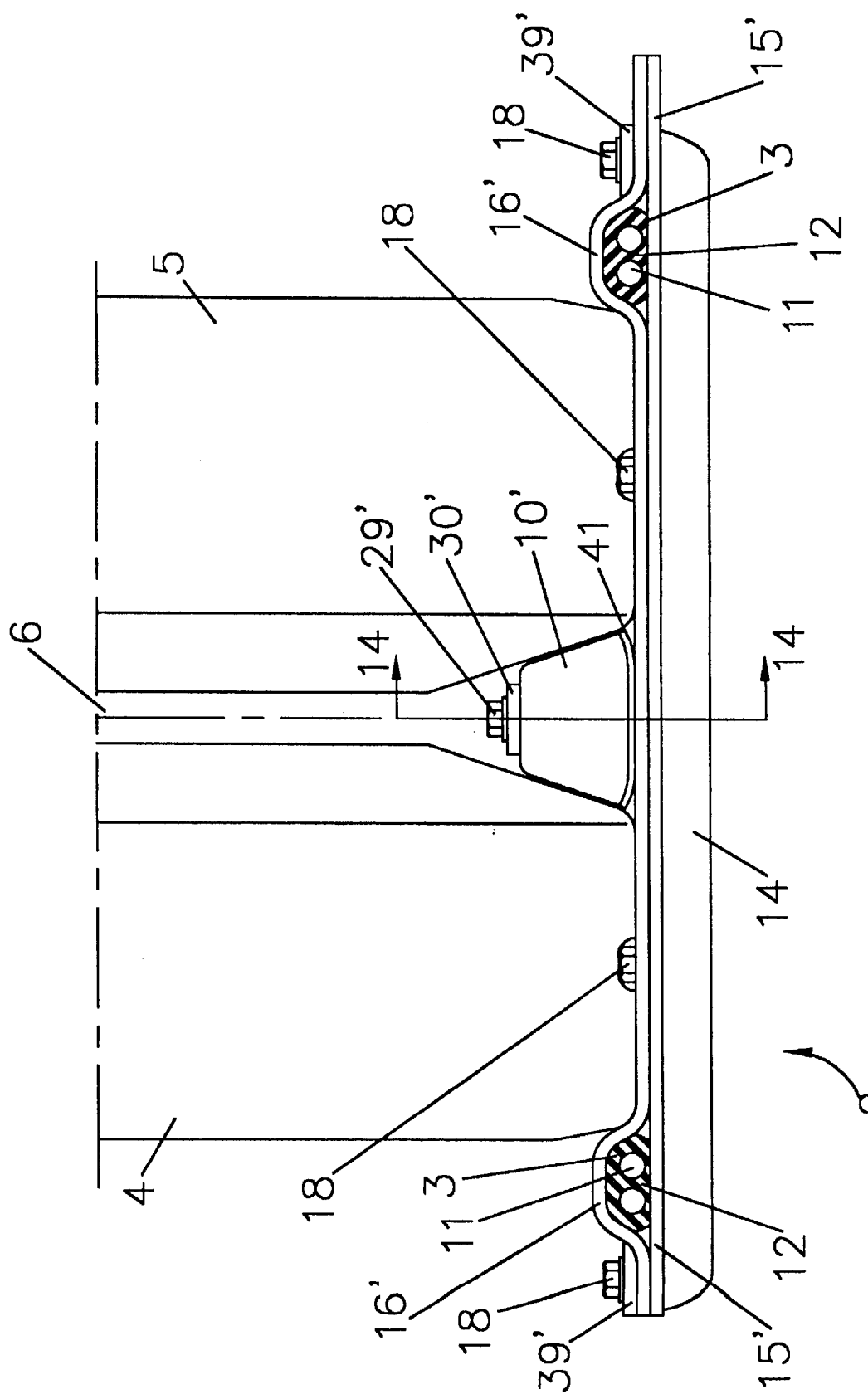
FIG. 13 is a cross section through the tractor tread.

As has been mentioned, different grouser lengths can be selected and, if desired, the end portions of the grouser-mounting base plates 15' and clamping strips 39' can overhang the grouser bars at one end, as shown at the right of FIG. 13.

I claim:

1. In a tractor, a tractor endless tread, wheel means carried by the tractor and engaged by the tractor endless tread, guide blocks carried by the tractor endless tread and spaced lengthwise thereof for engaging the wheel means to guide the tractor endless tread relative to the wheel means, and two bolts securing each guide block to the tractor endless tread for Preventing swiveling of the guide block relative to the tractor endless tread, the improvement comprising each guide block being of square cross section and having two pairs of holes extending therethrough each pair of holes being disposed in a plane, the planes of the holes being disposed perpendicular to each other so that the two bolts can extend through either pair of holes and the guide block can be turned 90 degrees to maintain the bolts in the same positions relative to the tractor endless tread when the block is turned through 90 degrees.

2. In the tractor defined in claim 1, a bottom plate overlying the tractor endless tread, fitting the bottom of a guide block and having spaced apertures for receiving therethrough the two bolts securing the guide block to the tractor endless tread.

3. In a tractor, a tractor endless tread, wheel means carried by the tractor and engaged by the tractor endless tread, guide blocks carried by the tractor endless tread and spaced lengthwise of the tractor endless tread for engaging the wheel means to guide the tractor endless tread relative to the wheel means, the tractor endless tread including an endless string of grouser-mounting base plates and an endless loop of wire rope disposed adjacent to the grouser-mounting base plates, adjacent grouser-mounting base plates being spaced lengthwise of the endless loop, a clamping strip overlying each grouser-mounting base plate and engaged with the endless loop, intermediate spacer strip means disposed coplanar with and bridging between adjacent clamping strips, tongue-and-groove joints between adjacent clamping strips and intermediate spacer strip means, each of the tongue-and-groove joints including grooves having outer sides formed by opposite margins of the grouser-mounting base plates projecting beyond the opposite edges of their clamping strips, the bottoms of the tongue-and-groove joint grooves being formed by the edges of the clamping strips, groove inner side means overhanging opposite edges of the clamping strips for forming the inner sides of the tongue-and-groove joint grooves, the tongues of the tongue-and-groove joints being formed by the opposite margins of the intermediate spacer strip means fitted in the groove, and securing means for securing each of the clamping strips to its grouser-mounting base plate for anchoring the endless loop to such grouser-mounting base plate, the improvement comprising a bottom plate for each guide block overlying a clamping strip and its grouser-mounting base plate and being of a width lengthwise of the tractor endless tread greater than the width of the clamping strip for forming the groove inner side means.

4. In the tractor defined in claim 3, two spaced bolts connecting each guide block, its bottom plate and a grouser-mounting base plate for securing each guide block to its grouser-mounting base plate.

5. In a tractor endless tread including an endless string of elongated grouser-mounting base plates and two endless loops of wire rope overlying and spaced lengthwise of the grouser-mounting base plates, a clamping strip overlying each grouser-mounting base plate, each clamping strip having two bows spaced longitudinally of said elongated grouser base plates, engaging the two endless loops, respectively, and extending between and connecting said bows for forming an integral clamping strip including said two bows, and securing means for securing each of said clamping strips to its grouser-mounting base plate for anchoring the endless loops to each grouser-mounting base plate.

6. In a tractor endless tread including an endless string of grouser-mounting base plates and two endless loops of wire rope overlying and spaced lengthwise of the grouser-mounting base plates, a clamping strip overlying each grouser-mounting base plate, intermediate strips disposed coplanar with and between adjacent clamping strips, each of said clamping strips and each of said intermediate strips having bows engageable with the endless loops, respectively, each of said clamping strips and each of said intermediate strips extending continuously between its bolts, and securing means for securing each of said clamping strips to its grouser-mounting base plate for anchoring the endless loop to such grouser-mounting base plate.

7. In a tractor, a tractor endless tread, wheel means carried by the tractor and engaged by the tractor endless tread, guide blocks carried by the tractor endless tread and spaced lengthwise of the tractor endless tread for engaging the wheel means to guide the tractor endless tread relative to the wheel means, the tractor endless tread including an endless string of grouser-mounting base plates and an endless loop of wire rope overlying the grouser-mounting base plates, a clamping strip overlying each grouser-mounting base plate and engaged with the endless loop, intermediate strip means disposed between and adjacent to adjacent clamping strips, and securing means for securing each of the clamping strips to its grouser-mounting base plate for anchoring the endless loop to such grouser-mounting base plate, the improvement comprising a bottom plate for each guide block overlying a clamping strip and being of a width lengthwise of the tractor endless tread greater than the width of the clamping strip for overlapping the inner side margin of the adjacent intermediate strip means.

8. In the tractor defined in claim 7, two spaced bolts connecting each guide block, its bottom plate and a grouser-mounting base plate for securing said guide block to its grouser-mounting base plate.

9. In a tractor endless tread including an endless string of grouser-mounting base plates and an endless loop of wire rope overlying the grouser-mounting base plates, the improvement comprising a clamping strip overlying each grouser-mounting base plate and engaged with the endless loop, the endless loop having two stretches of wire rope embedded in a body of elastomer material forming an embedment having a wider embedment side at one side of the wire rope stretches, a narrower embedment side at the opposite side of the wire rope stretches and opposite embedment edges joining said opposite embedment sides and converging away from said wider embedment side and toward said narrower embedment side, and said clamping strip having a bow embracing said opposite embedment edges, and securing means securing each of said clamping strips to its grouser-mounting base plate and causing said convergent embedment edges to exert a wedging action on said clamping strip bow for anchoring said embedment securely to its grouser-mounting base plate.

\* \* \* \* \*